(12) United States Patent
Ikemoto et al.

(10) Patent No.: US 7,843,781 B2
(45) Date of Patent: Nov. 30, 2010

(54) DISC DRIVE WITH ROTATIONAL DRIVING AND OPTICAL PICKUP

(75) Inventors: Yuichiro Ikemoto, Kanagawa (JP); Tatsumi Ito, Kanagawa (JP); Takeshi Matsui, Tokyo (JP); Koji Ashizaki, Tokyo (JP)

(73) Assignee: Sony Corporation, Tokyo (JP)

(*) Notice: Subject to any disclaimer, the term of this patent is extended or adjusted under 35 U.S.C. 154(b) by 427 days.

(21) Appl. No.: 12/002,583

(22) Filed: Dec. 18, 2007

(65) Prior Publication Data

US 2008/0170480 A1    Jul. 17, 2008

(30) Foreign Application Priority Data

Dec. 26, 2006  (JP)  ............................. 2006-350109

(51) Int. Cl.
    *G11B 7/00*     (2006.01)
(52) U.S. Cl. ................. 369/47.27; 369/47.28; 369/47.1
(58) Field of Classification Search ............... 369/47.27
    See application file for complete search history.

(56) References Cited

U.S. PATENT DOCUMENTS

| | | | |
|---|---|---|---|
| 5,450,379 A * | 9/1995 | Fujimori et al. .......... | 369/275.1 |
| 2001/0035886 A1 * | 11/2001 | Bradshaw et al. .............. | 347/2 |
| 2006/0221780 A1 * | 10/2006 | Sugahara .................. | 369/30.01 |
| 2007/0252889 A1 * | 11/2007 | Hanks et al. ................. | 347/238 |
| 2008/0150985 A1 | 6/2008 | Ikemoto et al. | |

FOREIGN PATENT DOCUMENTS

| | | | |
|---|---|---|---|
| JP | 07-057378 A | | 3/1995 |
| JP | 09-265760 A | | 10/1997 |
| JP | 10-228722 A | | 8/1998 |
| JP | 11-273233 A | | 10/1999 |
| JP | 2000-243021 A | | 9/2000 |
| JP | 2001291235 A | * | 10/2001 |
| JP | 2002-230764 A | | 6/2002 |
| JP | 2002-251862 A | | 9/2002 |
| JP | 2004-192735 A | | 7/2004 |
| JP | 2005-182980 A | | 7/2005 |
| JP | 2006-244601 A | | 9/2006 |

OTHER PUBLICATIONS

English translation of JP 2001-291235.*

* cited by examiner

*Primary Examiner*—Lixi Chow
(74) *Attorney, Agent, or Firm*—Wolf, Greenfield & Sacks, PC

(57) ABSTRACT

Disclosed is a disc drive apparatus. The disc drive apparatus includes a rotational driving unit rotating a disc-shaped recording medium having a plurality of addresses recorded on an information recording surface of the disc-shaped recording medium; an optical pickup recording and/or reproducing an information signal on the information recording surface of the disc-shaped recording medium rotated by the rotational driving unit; and a control unit controlling rotation of the disc-shaped recording medium via the rotational driving unit. In the disc drive apparatus, the control unit carries out a disc constant velocity rotating processing that sets a predetermined address out of the plurality of addresses as a constant velocity rotation address and continuously reproduces the constant velocity rotation address using the optical pickup.

6 Claims, 5 Drawing Sheets

DISC DRIVE WITH ROTATIONAL DRIVING AND OPTICAL PICKUP

CROSS REFERENCES TO RELATED APPLICATIONS

The present invention contains subject matter related to Japanese Patent Application JP 2006-350109 filed in the Japanese Patent Office on Dec. 26, 2006, the entire contents of which being incorporated herein by reference.

BACKGROUND OF THE INVENTION

1. Field of the Invention

The present invention relates to a disc drive apparatus that rotates a disc-shaped recording medium at a constant velocity, for example, a disc drive apparatus that can print visible information such as characters and designs by ejecting ink droplets onto a label surface of a disc-shaped recording medium rotated at a constant velocity.

2. Description of the Related Art

One example of an existing disc drive apparatus is disclosed in Japanese Unexamined Patent Application Publication No. 2001-291235. The publication relates to an optical disc drive apparatus having a function for recording data on a data recording surface of an optical disc and a function for carrying out label printing on a label surface of the optical disc. The optical disc printing apparatus disclosed by the publication includes a disc driving mechanism for supporting and axially rotating the optical disc, a data head for recording and reproducing data on the optical disc that is provided facing the data recording surface of the optical disc supported by the disc driving mechanism. The optical disc printing apparatus further includes a data head driving mechanism for moving the data head back and forth in the radial direction of the optical disc supported by the disc driving mechanism, a label printing head provided facing the label surface of the optical disc supported by the disc driving mechanism, and a print head driving mechanism for moving the label printing head back and forth in the radial direction of the optical disc supported by the disc driving mechanism. In the optical disc printing apparatus, the data head and the label printing head are moved while rotating the optical disc to record or reproduce data on the data recording surface and print on the label surface.

The optical disc drive apparatus disclosed by Japanese Unexamined Patent Application Publication No. 2001-291235 with the construction described above has a stated effect of realizing an optical disc drive apparatus that uses a label printing head with a low cost construction where the label printing head is free to move in only a single dimension, that is, back and forth in the radial direction of the optical disc, and uses the rotation of the optical disc on which data is being recorded or reproduced so as to be able to print on the entire label surface, i.e., a two-dimensional surface (see Paragraph [0008]).

Another example of an existing disc drive apparatus of this type is disclosed by Japanese Unexamined Patent Application Publication No. 2005-346778. The publication relates to a disc drive apparatus that correctly determines a recording position when recording (forming) designs or characters (images) on the label surface. The disc drive apparatus disclosed by the publication records and reproduces information on an information surface of a recording disc having a label surface provided with a pit sequence, where pits for guiding are provided with a predetermined pitch, and records or forms images or characters on the label surface. The disc drive apparatus includes a system control circuit that controls the various components of the disc drive apparatus, and an optical pickup that emits laser light to record or reproduce information on the information surface of the recording disc and/or to form images and characters on the label surface. The disc drive apparatus further includes a focus servo circuit that carries out focus control according to instructions from the system control circuit to drive a focus actuator of the optical pickup based on the focus error signal, and a tracking servo circuit that carries out tracking control according to instructions from the system control circuit to drive a tracking actuator of the optical pickup based on a tracking error signal when recording or reproducing data and carries out label surface print tracking control based on the disposed pits when printing on the label surface.

The disc drive apparatus disclosed by Patent Document 2 with the construction described above has a stated effect that when images and characters are recorded (formed) on the label surface of the recording disc, a base position of the recording disc is detected from the arrangement of pits to correctly determine a freely chosen recording starting position (see Paragraph [0033]).

However, for the optical disc drive apparatus disclosed by Japanese Unexamined Patent Application Publication No. 2005-346778, since the rotational velocity of the optical disc varies according to the employs a function to carry out an ink ejection timing control processing. In the ink ejection timing control processing, the ejection timing of the label printing head is corrected before the ink ejection processing is carried out. That is, in the ink ejection timing control processing, first an ejection timing correction processing is carried out to detect a base angle (i.e., polar axis) for rotation of the optical disc, and then the ejection timing correction processing is carried out again to determine whether the ink ejection start angle has been reached. Once the ink ejection start angle is reached, the ejection timing correction processing is carried out again to correct the ejection timing and then the ink ejection processing is carried out. In this manner, if the ejection timing of ink is synchronized with the rotation of the optical disc that is a constant linear velocity, it may be necessary to frequently correct the ejection timing. As a result, control over ejection timing has been complicated.

The disc drive apparatus disclosed by Japanese Unexamined Patent Application Publication No. 2005-346778 is constructed so that when images and characters are printed on the label surface, CAV (constant angular velocity) control is carried out over a spindle motor so that FG pulses generated by a frequency generator (FG) have a constant frequency. Thus it is desirable to provide a frequency generator (FG) that is directly coupled to the rotational shaft of the spindle motor, which leads to an increase in the apparatus cost.

In addition, the disc drive apparatus according to this publication is constructed so that position information is obtained for the recording disc that is being rotationally driven by detecting the pit sequence on the recording disc. Accordingly, before images and characters are recorded on the label surface of the recording disc, it may be necessary to provide a pit sequence on the label surface using the optical pickup.

SUMMARY OF THE INVENTION

According to an embodiment of the present invention, an existing disc drive apparatus of this type, to synchronize with the (constant linear velocity) rotation of a disc-shaped recording medium and correct the ejection timing of ink, the control of ejection timing is complex. In addition, when CAV (constant angular velocity) control is carried out over the spindle motor using a frequency generator (FG) to rotate the disc-shaped recording medium at a constant velocity, the apparatus cost will increase and special processing of the disc-shaped recording medium may have to be prepared for obtaining position information for the disc-shaped recording medium.

A disc drive apparatus according to the present invention includes: a rotational driving unit that rotates a disc-shaped recording medium, where a plurality of addresses are recorded on an information recording surface of the disc-shaped recording medium; an optical pickup that records and/or reproduces an information signal on the information recording surface of the disc-shaped recording medium that is rotated by the rotational driving unit; and a control unit that controls rotation of the disc-shaped recording medium via the rotational driving unit. The control unit carries out a disc constant velocity rotating processing that sets a predetermined address out of the plurality of addresses as a constant velocity rotation address and continuously reproduces the constant velocity rotation address using the optical pickup.

With the disc drive apparatus according to the present invention, by carrying out the disc constant velocity rotating processing, it is possible to rotate the disc-shaped recording medium at a constant velocity while obtaining position information for the disc-shaped recording medium. As a result, when a print head is provided and visible information is printed on the label surface of the disc-shaped recording medium, it is possible to make the timing for ejecting ink droplets constant and thereby simplify the control of the timing for ejecting ink droplets.

BRIEF DESCRIPTION OF THE DRAWINGS

FIG. 4A is a schematic diagram showing a state where one address on a disc-shaped recording medium is continuously reproduced as a constant velocity rotation address and FIG. 4B is a schematic diagram showing a state where one address closer to the inner periphery than the constant velocity rotation address shown in FIG. 4A is continuously reproduced as a constant velocity rotation address.

DESCRIPTION OF THE PREFERRED EMBODIMENTS

A disc drive apparatus that can rotate a disc-shaped recording medium at a constant velocity without using a special-purpose component such as a frequency generator (FG) and can also obtain position information for the rotating disc-shaped recording medium is realized with a simple construction.

Although preferred embodiments of a disc drive apparatus according to the present invention will now be described with reference to the attached drawings, the present invention is not limited to such embodiments.

Figure 1:
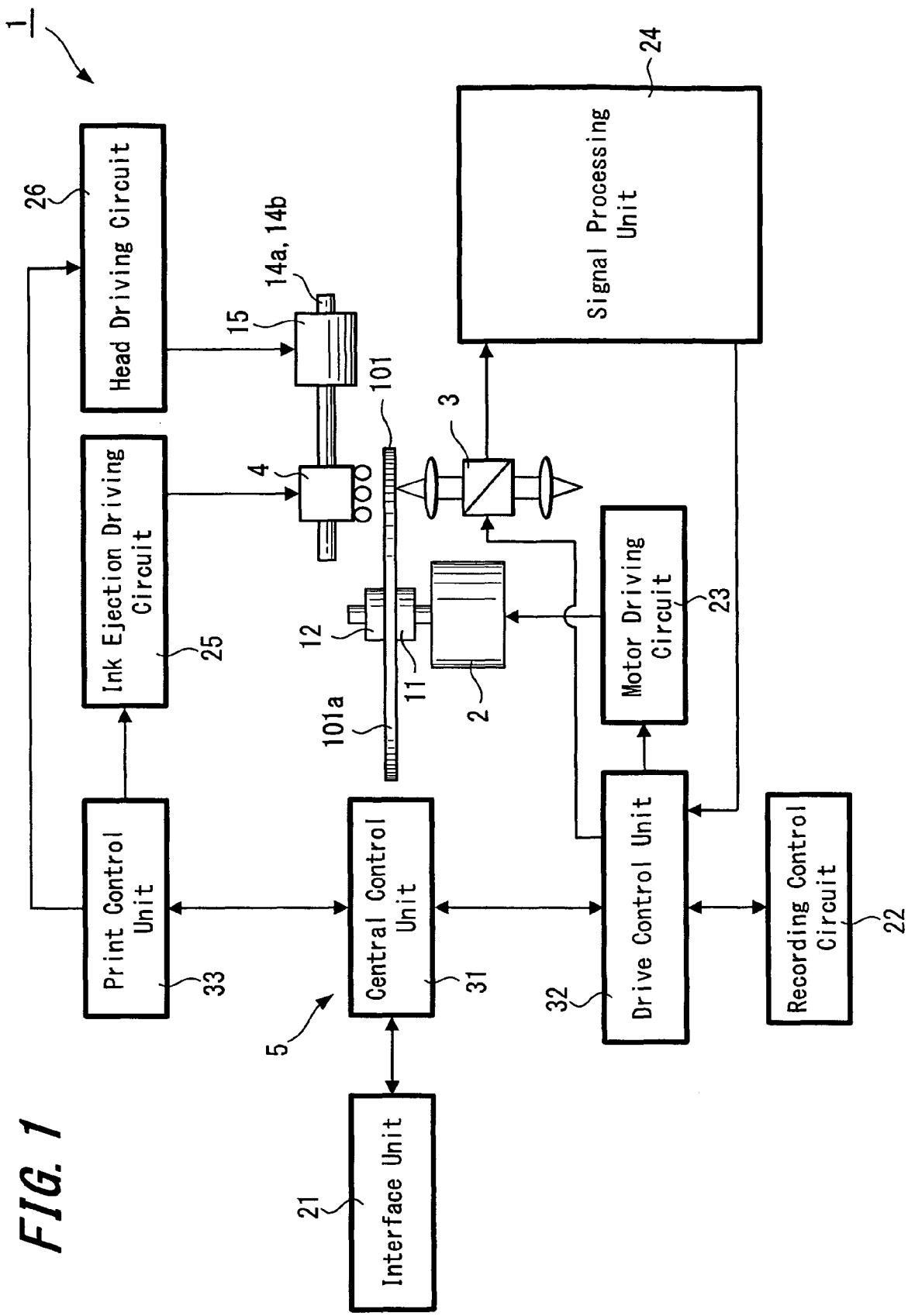
FIG. 1 is a block diagram showing a first embodiment of a disc drive apparatus according to the present invention.
Figure 2:
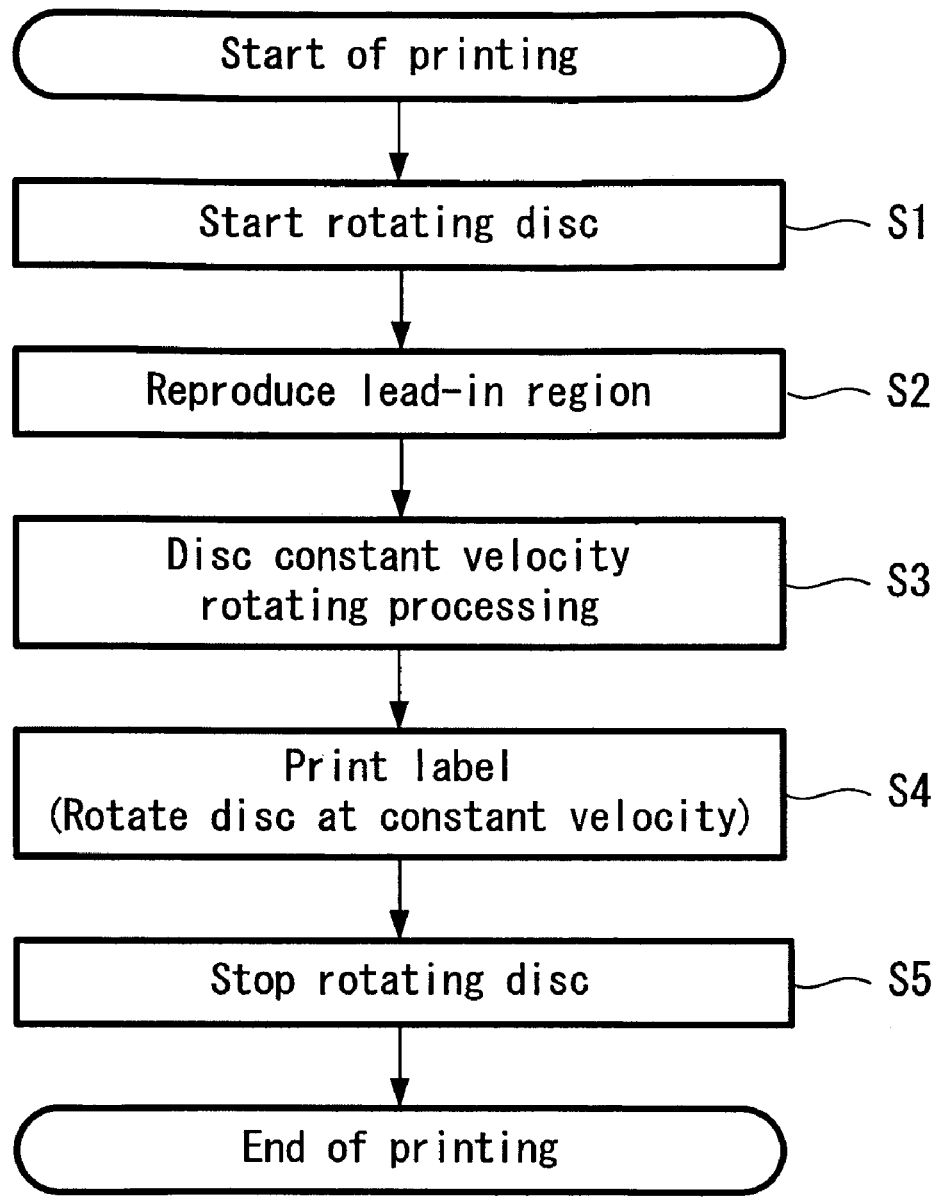
FIG. 2 is a flowchart showing the procedure of a print processing according to the first embodiment of a disc drive apparatus according to the present invention.
Figure 3:
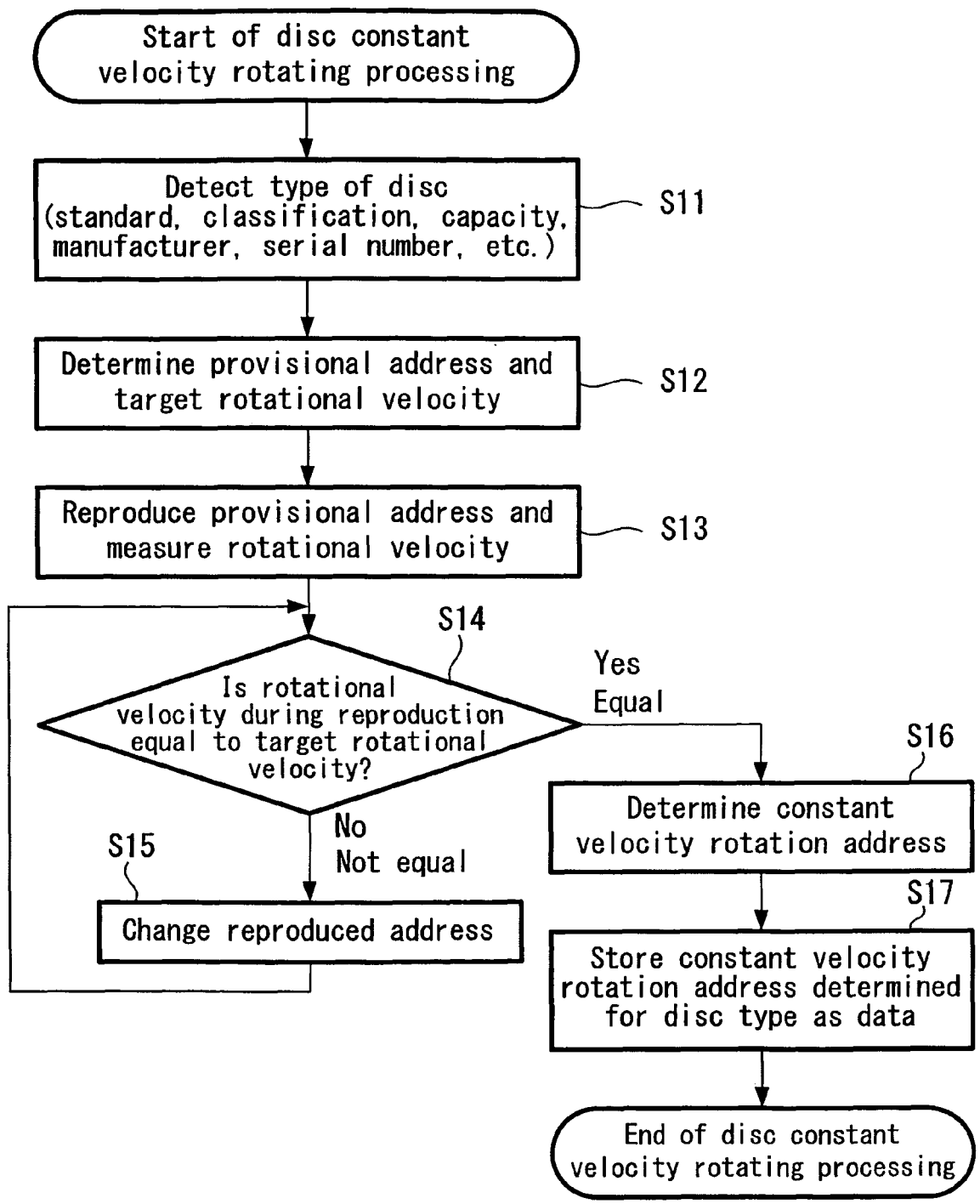
FIG. 3 is a flowchart showing the procedure of a disc constant velocity rotating processing according to the first embodiment of a disc drive apparatus according to the present invention.
Figure 4A:
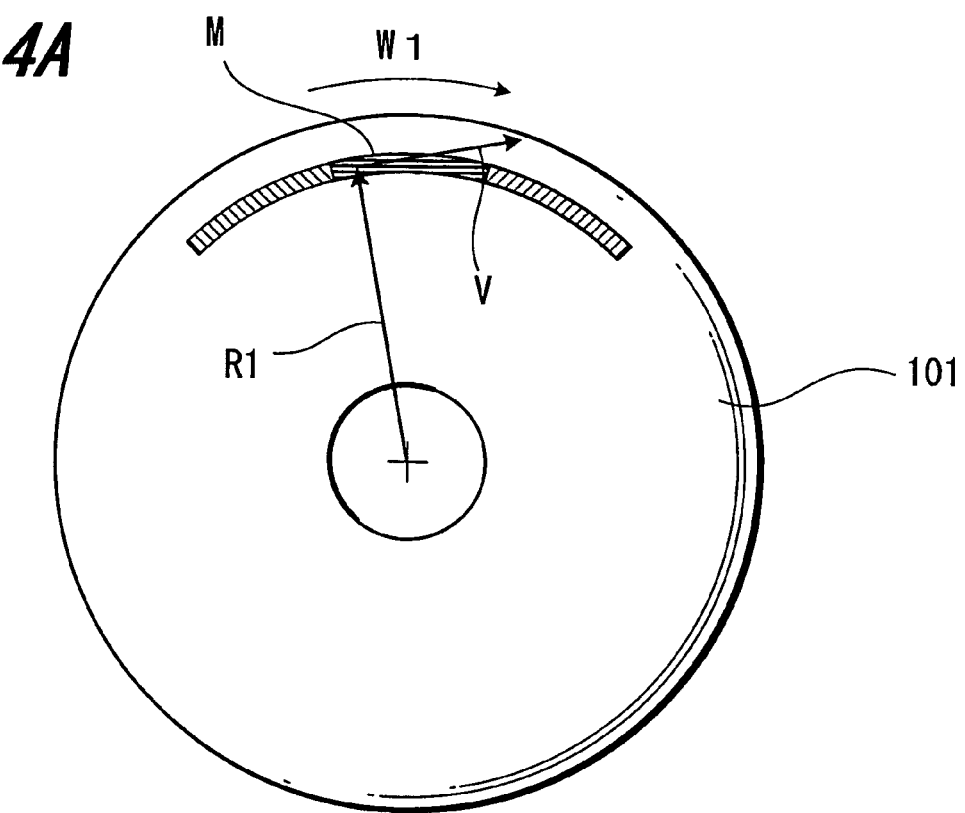
FIGS. 4A and 4B are diagrams useful in explaining a constant velocity rotation address according to the first embodiment of a disc drive apparatus according to the present invention, where
Figure 4B:
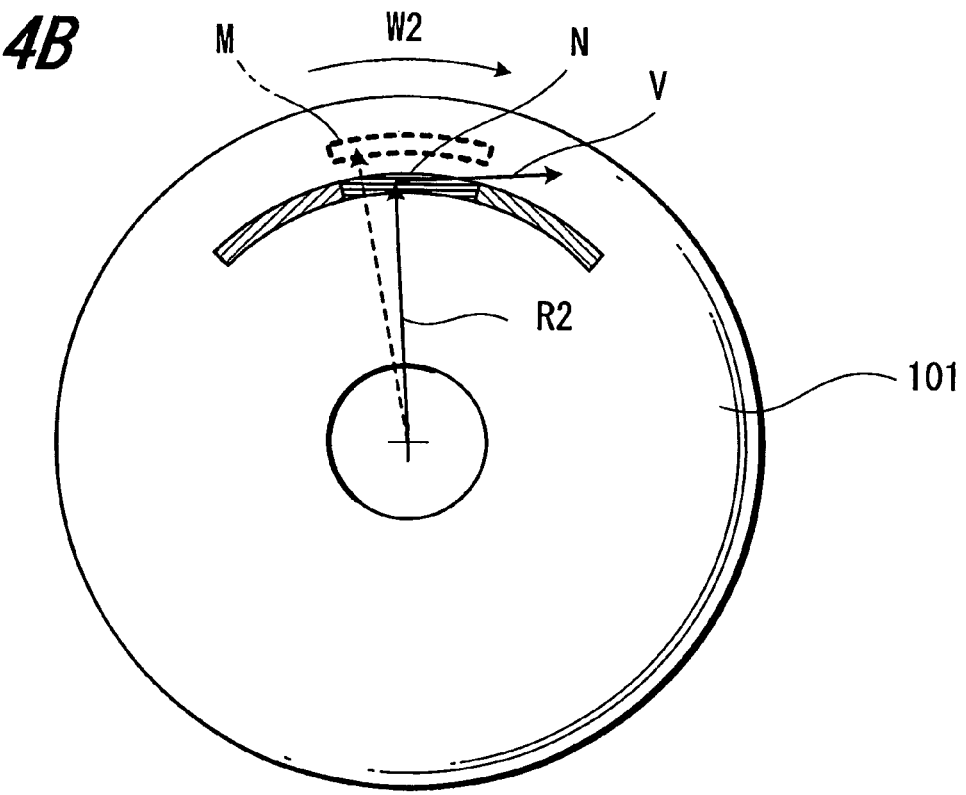
Figure 5:
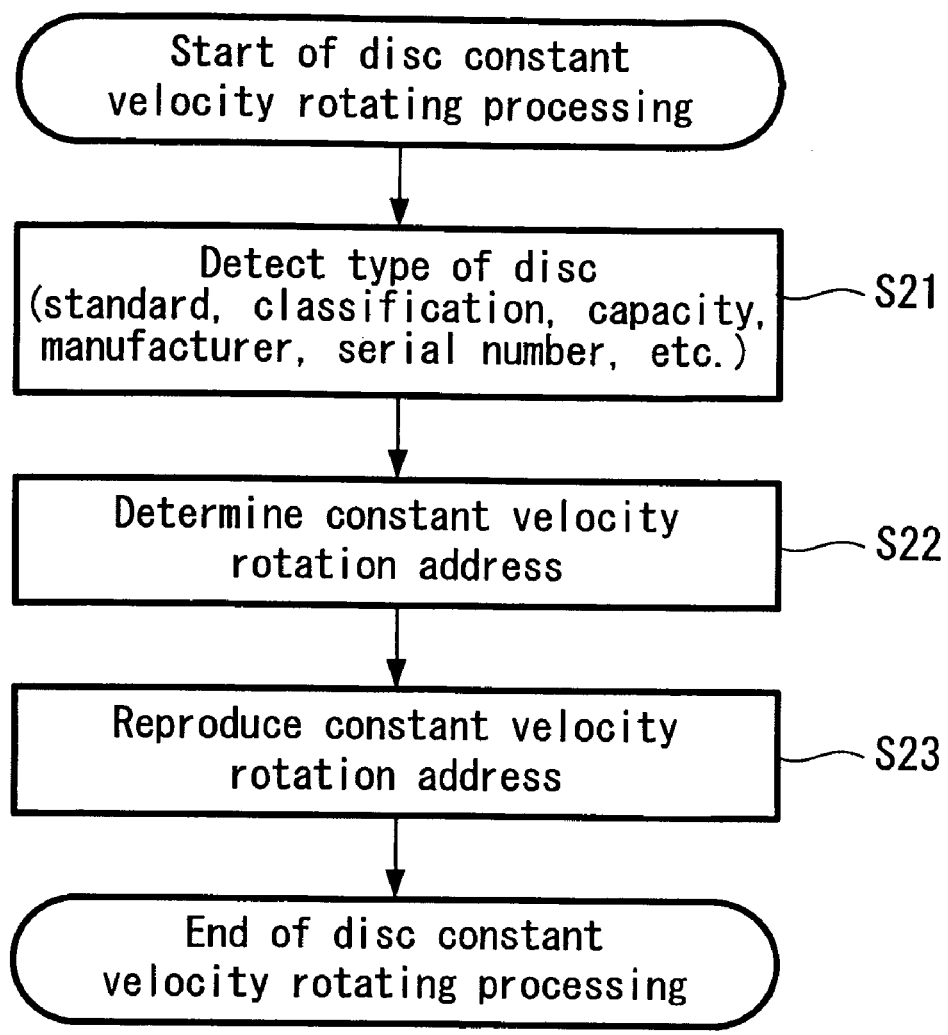
FIG. 5 is a flowchart showing the procedure of a disc constant velocity rotating processing according to a second embodiment of a disc drive apparatus according to the present invention.

FIGS. 1 to 5 show embodiments of the present invention. FIG. 1 is a block diagram showing a first embodiment of a disc drive apparatus according to the present invention. FIG. 2 is a flowchart showing the procedure of a print processing. FIG. 3 is a flowchart showing the procedure of a disc constant velocity rotating processing. FIGS. 4A and 4B are diagrams useful in explaining a constant velocity rotation address. FIG. 5 is a flowchart showing the procedure of a disc constant velocity rotating processing according to a second embodiment of a disc drive apparatus according to the present invention.

A disc drive apparatus 1 shown in FIG. 1 newly records (writes) an information signal on an information recording surface of the optical disc 101 that is a specific example of a disc-shaped recording medium such as a CD-R (Compact Disc-Recordable) or a DVD-RW (Digital Versatile Disc-Rewritable), and reproduces (reads) an information signal recorded in advance, and is also capable of printing visible information such as characters and designs on a label surface 101a of the optical disc 101.

As shown in FIG. 1, the disc drive apparatus 1 includes a spindle motor 2 indicating a specific example of a rotational driving unit that rotates an optical disc 101, an optical pickup 3 that carries out the recording and/or reproducing of information on an information recording surface of the optical disc 101 rotated by the spindle motor 2, a print head 4 that prints visible information such as characters and images by ejecting ink droplets onto the label surface 101a of the rotating optical disc 101, and a control unit 5 that controls the optical pickup 3 and the print head 4.

A turntable 11 is provided at a front end of the rotational shaft of the spindle motor 2. The turntable 11 includes a disc engagement portion that detachably engages a center hole of the optical disc 101. By attaching the disc engagement portion to the center hole of the optical disc 101, the optical disc 101 can rotate together with the turntable 11. By rotationally driving the spindle motor 2, the optical disc 101 is rotated together with the turntable 11.

A chucking plate 12 that presses the optical disc 101 on the turntable 11 from above is provided above the spindle motor 2. The chucking plate 12 is rotatably supported by a support plate, not shown, and rotates together with the rotated optical disc 101. The optical disc 101 is sandwiched between the chucking plate 12 and the turntable 11, thereby preventing the disc engagement portion of the turntable 11 from coming out of the center hole of the optical disc 101.

The optical pickup 3 includes a light detector, an objective lens, and a biaxial actuator that moves the objective lens so as to face the information recording surface (i.e., the opposite surface to the label surface 101a) of the optical disc 101. The optical pickup 3 has a light beam emitted from the light detector, focuses the light beam onto the information recording surface of the optical disc 101 using the objective lens, and receives a return light beam that has been reflected by the information recording surface via the light detector. By doing so, the optical pickup 3 can record (write) an information signal or reproduce (read) an information signal that has previously been recorded on the information recording surface.

The optical pickup 3 is mounted on a pickup base, not shown, and moves together with the pickup base. The pickup base can be moved in the radial direction of the optical disc 101 by a pickup moving mechanism including a pickup motor, not shown. When the pickup base moves, the optical pickup 3 records an information signal on the information recording surface of the optical disc 101 or reproduces an information signal that has been recorded on the information recording surface.

As one example, it is possible to use a feed screw mechanism as the pickup moving mechanism that moves the pickup base. However, the pickup moving mechanism according to an embodiment of the present invention is not limited to a feed screw mechanism, and as other examples, it is also possible to use a rack and pinion mechanism, a belt feed mechanism, a wire feed mechanism, or other type of mechanism.

The print head 4 is positioned opposite the label surface 101*a* of the optical disc 101. Although not shown, a plurality of ejection nozzles that eject ink droplets are provided on a surface of the print head 4 that faces the label surface 101*a*. The plurality of ejection nozzles of the print head 4 are constructed of nozzle groups that eject ink droplets of a predetermined color. In the present embodiment, four nozzle groups includes a cyan nozzle group that ejects cyan (C) ink droplets, a magenta nozzle group that ejects magenta (M) ink droplets, a yellow nozzle group that ejects yellow (Y) ink droplets, and a black nozzle group that ejects black (K) ink droplets are provided.

Two guide shafts 14*a*, 14*b* that are parallel are slidably inserted through the print head 4. The two guide shafts 14*a*, 14*b* extend in the radial direction of the optical disc 101 and both ends thereof in the axial direction are fixed to a guide shaft support member. The print head 4 can be moved along the two guide shafts 14*a*, 14*b* by a head moving mechanism including a head driving motor 15. However, as with the pickup moving mechanism, a feed screw mechanism, a rack and pinion mechanism, a belt feed mechanism, a wire feed mechanism, or other type of mechanism can be used as the head moving mechanism.

The disc drive apparatus 1 includes the control unit 5, an interface unit 21, a recording control circuit 22, a motor driving circuit 23, a signal processing circuit 24, an ink ejection driving circuit 25, and a head driving circuit 26.

The interface unit 21 is a connector that electrically connects an external apparatus, such as a personal computer, and the disc drive apparatus 1. The interface unit 21 outputs signals supplied from the external apparatus to the control unit 5 and outputs signals supplied from the control unit 5 to the external apparatus. As examples, the signals supplied from the external apparatus can be a recording data signal corresponding to recording information to be recorded on the information recording surface of the optical disc 101 and an image data signal corresponding to visible information to be printed on the label surface 101*a* of the optical disc 101. Also as one example, the signal supplied from the control unit 5 can be a reproduced data signal read from the information recording surface of the optical disc 101.

The control unit 5 includes a central control unit 31, a drive control unit 32, and a print control unit 33. The central control unit 31 controls the drive control unit 32 and the print control unit 33. The central control unit 31 outputs a recording data signal supplied from the interface unit 21 to the drive control unit 32 and the image data signal supplied from the interface unit 21 to the print control unit 33. The central control unit 31 also outputs a position data signal showing position information for the optical disc 101 supplied from the drive control unit 32 to the print control unit 33.

The drive control unit 32 outputs a control signal to the motor driving circuit 23 to control the rotation of the spindle motor 2 and a pickup driving motor, not shown. The drive control unit 32 outputs a control signal to the optical pickup 3 to control a tracking servo and a focusing servo so that the light beam emitted from the optical pickup 3 follows a track on the optical disc 101. Also, the drive control unit 32 outputs the position data signal supplied from the signal processing unit 24 to the central control unit 31.

The recording control circuit 22 carries out processes such as encoding and modulating of the reproduced data signal supplied from the drive control unit 32 and outputs the processed reproduced data signal to the drive control unit 32. The motor driving circuit 23 drives the spindle motor 2 based on a control signal supplied from the drive control unit 32. Accordingly, the optical disc 101 on the turntable 11 of the spindle motor 2 is rotated. The motor driving circuit 23 drives the pickup driving motor based on the control signal from the drive control unit 32. Thus, the optical pickup 3 is driven in the radial direction of the optical disc 101 together with the pickup base.

The signal processing unit 24 carries out processes such as demodulation and error detection on an RF (Radio Frequency) signal supplied from the optical pickup 3 to generate the reproduced data signal. Based on the RF signal, the signal processing unit 24 detects a signal with a specified pattern such as a synchronization signal and/or a position data signal as a signal showing position information for the optical disc 101. The signal processing unit 24 also outputs the reproduced data signal and the position data signal to the drive control unit 32.

The print control unit 33 controls the print head 4, the head driving motor 15, and the like to have visible information printed on the label surface 101*a* of the optical disc 101. The print control unit 33 generates ink ejection data based on the image data signal supplied from the central control unit 31. The print control unit 33 generates control signals for controlling the print head 4 and the head driving motor 15 based on the generated ink ejection data and the position data signal supplied from the central control unit 31, and outputs the control signals to the ink ejection driving circuit 25 and the head driving circuit 26.

The ink ejection driving circuit 25 drives the print head 4 based on the control signal supplied from the print control unit 33. Thus, ink droplets are ejected from the plurality of ejection nozzles of the print head 4 and dripped onto the label surface 101*a* of the rotating optical disc 101. The head driving circuit 26 drives the head driving motor 15 based on a control signal supplied from the print control unit 33. By driving the head driving motor 15, the print head 4 is moved in the radial direction of the optical disc 101.

FIG. 2 is a flowchart showing the processing procedure where the disc drive apparatus 1 prints visible information on the label surface 101*a* of the optical disc 101. To print the visible information on the label surface 101*a* of the optical disc 101, first the drive control unit 32 controls the spindle motor 2 to rotate the optical disc 101 (step S1). Next, the drive control unit 32 controls the optical pickup 3 to reproduce the lead-in region of the optical disc 101 (step S2).

Next, the drive control unit 32 controls the spindle motor 2 to carry out a disc constant velocity rotating processing that rotates the optical disc 101 at a constant velocity (step S3). When doing so, the signal processing circuit 24 detects the position data signal that shows position information for the optical disc 101 and supplies the position data signal to the print control unit 33 via the drive control unit 32 and the central control unit 31.

Next, the print control unit 33 controls the ink ejection driving circuit 25 and the head driving circuit 26 based on the position data signal and the ink ejection data to print the visible information on the label surface 101*a* of the optical disc 101 (step S4). When doing so, since the print head 4 ejects ink droplets onto the label surface 101a of the optical disc 101 that is rotated at a constant velocity, it is possible to keep the ejection timing of the ink droplets constant, so that the control of the ink ejection driving circuit 25 and the head driving circuit 26 by the print control unit 33 can be simplified.

After this, when the printing of the visible information has been completed, the drive control unit 32 controls the spindle motor 2 to stop the rotation of the optical disc 101 (step S5). Then, the printing of the visible information on the label surface 101a of the optical disc 101 is completed.

Next, the disc constant velocity rotating processing that rotates the optical disc 101 at a constant velocity will be described with reference to FIGS. 3 and 4. FIG. 3 is a flowchart showing the procedure of the disc constant velocity rotating processing. As shown in FIG. 3, when the disc constant velocity rotating processing starts, first the central control unit 31 detects the type of the optical disc 101 based on the reproduced data signal supplied from the drive control unit 32 (step S11). The type of optical disc 101 is determined from a combination of a disc standard such as CD (Compact Disc), DVD (Digital Versatile Disc), and Blu-ray Disc (Registered Trademark of Sony Corp.), a disc classification such as single layer (SL) or double layer (DL), the recording capacity, the manufacturer, the serial number, and the like.

Next, the central control unit 31 determines a provisional address and a target rotational velocity based on the type of optical disc 101 (step S12). The provisional address and the target rotational velocity will now be described. The target rotational velocity is a target velocity (rpm) for when the optical disc 101 is rotated at a constant velocity. The provisional address is an address that is continuously reproduced by the optical pickup 3, and is provisionally determined in order to rotate the optical disc 101 at the target rotational velocity.

A plurality of addresses are registered on the information recording surface of the optical disc 101. The respective absolute positions (radial positions) of such addresses on the information recording surface are decided in advance. This indicates that by continuously reproducing one address out of such plurality of addresses (at a constant linear velocity), it is possible to rotate the optical disc 101 at a constant velocity.

FIGS. 4A and 4B are schematic diagrams showing a state where a predetermined address out of the plurality of addresses on the optical disc 101 is used as a constant velocity rotation address and the constant velocity rotation address is continuously reproduced. The radial position of the constant velocity rotation address M shown in FIG. 4A is "R1" and the rotational velocity of the optical disc 101 when the constant velocity rotation address M is continuously reproduced at a linear velocity V is "ω1".

To rotate the optical disc 101 at a constant velocity that is higher than the rotational velocity "ω1", an address positioned closer to the inner periphery than the constant velocity rotation address M is set as the constant velocity rotation address. That is, as shown in FIG. 4B, an address N at a radial position R2 with a smaller radius than a radial position R1 (i.e., R1>R2) is set as the constant velocity rotation address and the constant velocity rotation address N is consecutively reproduced at the linear velocity V. In this way, compared to when the constant velocity rotation address M is reproduced, the length in the circumferential direction of the optical disc 101 that faces the optical pickup 3 (see FIG. 1) is reduced when the constant velocity rotation address N is reproduced. As a result, the rotational velocity of the optical disc 101 when the constant velocity rotation address N is continuously reproduced is the rotational velocity "ω2" which is higher than the rotational velocity "ω1".

The linear velocity when the address is reproduced will differ depending on the type of optical disc (which is determined by the combination of the disc standard, the disc classification, the capacity, the manufacturer, the serial number, and the like), but if the disc standard is the same, the linear velocities of different discs will be similar. For example, the linear velocity of a single-layer DVD is around 3.49 m/s and the linear velocity of a single-layer DVD is around 3.84 m/s. Since the rotational velocity of the optical disc is determined according to the radial position of the reproduced address and the linear velocity, in the present embodiment the same target rotational velocity is set for optical discs of the same disc standard.

The absolute positions (radial positions) of the addresses recorded on the information recording surface differ for each type of optical disc. For this reason, a provisional address is set for each type of optical disc based on each target rotational velocity. The provisional address set for each type of optical disc and the target rotational velocity set for each disc standard of optical discs are stored in advance in a memory, not shown, of the central control unit 31. Examples of the provisional addresses and the target rotational velocities stored in the memory of the central control unit 31 are shown in Table 1.

TABLE 1

| DISC STANDARD | DISC CLASSIFICATION | CAPACITY | PROVISIONAL ADDRESS | TARGET ROTATIONAL VELOCITY |
| --- | --- | --- | --- | --- |
| DISC A | SL | W (Bytes) | (HEX) A0000000 | A (rpm) |
| DISC B | SL | X (Bytes) | (HEX) B0000000 | B (rpm) |
| DISC C | SL | Y (Bytes) | (HEX) C0000000 | C (rpm) |
| DISC C | DL | Z (Bytes) | (HEX) D0000000 | C (rpm) |

The determining of the provisional address and the target rotational velocity in step S12 is carried out by the central control unit 31 reading the provisional address and the target rotational velocity corresponding to the optical disc 101 from the memory. For example, when the disc standard of the optical disc 101 is "DISC C", the disc classification is "SL", and the recording capacity is Y (bytes), the central control unit 31 reads the provisional address "C0000000" and the target rotational velocity "C (rpm)" from the memory.

Once the provisional address and the target rotational velocity have been determined based on the type of optical disc 101, the central control unit 31 outputs the determined provisional address to the drive control unit 32. The drive control unit 32 controls the optical pickup 3 and the spindle motor 2 to continuously reproduce the supplied provisional address and measure the rotational velocity of the rotating optical disc 101 (step S13). Next, the central control unit 31 determines whether the measured rotational velocity of the optical disc 101 is equal to the target rotational velocity (step S14). When the measured rotational velocity of the optical disc 101 is equal to the target rotational velocity, the central control unit 31 sets the address being reproduced, that is, the provisional address as the constant velocity rotation address (step S16).

When the measured rotational velocity of the optical disc 101 is not equal to the target rotational velocity, the central control unit 31 changes the reproduced address and outputs the new address to the drive control unit 32. If the measured rotational velocity of the optical disc 101 is below the target rotational velocity, the central control unit 31 sets an address that is closer to the inner periphery than the provisional address as the new address, while if the rotational velocity of the optical disc 101 is above the target rotational velocity, the central control unit 31 sets an address that is closer to the outer periphery than the provisional address as the new address. The drive control unit 32 then controls the optical pickup 3 and the spindle motor 2 to continuously reproduce the new address and measures the rotational velocity of the rotating optical disc 101 (step S15).

After this, the processing returns to step S14 and the central control unit 31 determines whether by reproducing the new address, the rotational velocity of the rotating optical disc 101 has become equal to the target rotational velocity. Step S14 and step S15 are then repeated until the rotational velocity of the optical disc 101 becomes equal to the target rotational velocity. When the rotational velocity of the optical disc 101 has become equal to the target rotational velocity, the central control unit 31 sets the address being reproduced at that time as the constant velocity rotation address (step S16).

Next, the central control unit 31 stores the determined constant velocity rotation address and the type of the optical disc 101 being rotated in the memory (step S17). The disc constant velocity rotating processing that rotates the optical disc 101 at the target rotational velocity is completed. In this way, by storing the determined constant velocity rotation address in the memory, when a disc constant velocity rotating processing is thereafter carried out on an optical disc 101 of the same type, the central control unit 31 can read the stored constant velocity rotation address as the provisional address. As a result, there will be a high probability that the rotational velocity of the optical disc 101 when the provisional address is reproduced will be equal to the target rotational velocity, which means it is possible to reduce the processing time.

Since the optical pickup 3 continuously reproduces the constant velocity rotation address during the disc constant velocity rotating processing, the signal processing unit 24 can detect position information for the optical disc 101 as the position data signal based on the reproduced constant velocity rotation address. The print control unit 33 can control the ink ejection driving circuit 25 and the head driving circuit 26 based on the position data signal, so that visible information can be printed on the label surface 101a of the optical disc 101.

FIG. 5 is useful in explaining a second embodiment of a disc drive apparatus according to the present invention and is a flowchart showing the procedure of the disc constant velocity rotating processing. The disc drive apparatus according to the second embodiment of the present invention has the same construction as the disc drive apparatus 1 of the first embodiment and differs to the disc drive apparatus 1 in the disc constant velocity rotating processing. For this reason, only the disc constant velocity rotating processing according to the second embodiment will be described here.

As shown in FIG. 5, with the disc drive apparatus according to the second embodiment of the present invention, when the disc constant velocity rotating processing starts, first the central control unit 31 detects the type of the optical disc 101 based on the reproduced data signal supplied from the drive control unit 32 (step S21). In the same way as the type of the optical disc 101 according to the first embodiment, the type of the optical disc 101 is determined from the standard, classification, capacity, manufacturer, serial number, and the like of the optical disc.

Next, the central control unit 31 determines the constant velocity rotation address based on the type of the detected optical disc 101 (step S22). The constant velocity rotation address is set for each type of optical disc based on the target rotational velocity set for each disc standard of optical discs. That is, in the disc constant velocity rotating processing according to the second embodiment, the provisional address according to the first embodiment is processed as the constant velocity rotation address. In the same way as in the first embodiment, a plurality of constant velocity rotation addresses set for each type of disc are stored in advance in a memory, not shown, of the central control unit 31. Examples of the constant velocity rotation addresses stored in the memory of the central control unit 31 are shown in Table 2.

TABLE 2

| DISC STANDARD | DISC CLASSI-FICATION | CAPACITY | CONSTANT VELOCITY ROTATION ADDRESS |
|---|---|---|---|
| DISC A | SL | W (Bytes) | (HEX) A0000000 |
| DISC B | SL | X (Bytes) | (HEX) B0000000 |
| DISC C | SL | Y (Bytes) | (HEX) C0000000 |
| DISC C | DL | Z (Bytes) | (HEX) D0000000 |

The constant velocity rotation address in step S22 is determined by the central control unit 31 reading the constant velocity rotation address corresponding to the rotating optical disc 101 from the memory. For example, when the disc standard of the optical disc 101 is "DISC C", the disc classification is "SL", and the recording capacity is Y (bytes), the central control unit 31 reads the constant velocity rotation address "C0000000" from the memory.

Once the constant velocity rotation address has been determined based on the type of optical disc 101, the central control unit 31 outputs the determined constant velocity rotation address to the drive control unit 32. The drive control unit 32 controls the optical pickup 3 and the spindle motor 2 to continuously reproduce the supplied constant velocity rotation address (step S23). The optical disc 101 is rotated at a constant rotational velocity that approximately matches the target rotational velocity, and the disc constant velocity rotating processing ends.

As described above, with the disc drive apparatus according to the second embodiment of the present invention, the constant velocity rotation address corresponding to the rotating optical disc is read from a plurality of constant velocity rotation addresses stored in the memory. By then continuously reproducing the read constant velocity rotation address using the optical pickup 3, the rotational velocity of the rotating optical disc can be approximately matched to the target rotational velocity set for each disc standard.

Also, since there is no processing for making the rotational velocity of the optical disc match a predetermined rotational velocity (the "target rotational velocity"), it is possible to reduce the processing time compared to the disc constant velocity rotating processing according to the first embodiment where such processing is carried out. It is also possible to reduce the storage capacity of the memory compared to the disc drive apparatus 1 according to the first embodiment and to reduce the power consumed by the central control unit 31 and the drive control unit 32.

Although a memory for storing the provisional addresses and constant velocity rotation addresses is provided in the central control unit 31 in the first and second embodiments described above, the memory for the embodiment of the present invention is not limited thereto. As examples, the memory for the present invention may be provided in the drive control unit 32 or provided as a storage unit separate from the central control unit 31 and the drive control unit 32.

Also, although the same target rotational velocity is set for optical discs of the same disc standard in the first and second embodiments described above, the target rotational velocity for the embodiment of the present invention is not limited thereto. As examples, it is also possible to set a target rotational velocity for all types of optical discs or to set the target rotational velocity separately for each type of optical disc.

In addition, in the embodiments described above, although the optical disc is rotated at a constant velocity by carrying out the disc constant velocity rotating processing when printing on the label surface 101a of the optical disc 101, the disc constant velocity rotating processing can also be carried out even when printing is not being performed. As one example, for a DNA disc where electrophoretic separation, detection, recording, and management of biological material such as DNA are realized using an optical disc, the disc constant velocity rotating processing according to the present invention can be adapted to processes such as probe spotting and fluorometry. Also, during chemical analysis where channels are provided on an optical disc, it is also possible to apply the disc constant velocity rotating processing when using centrifugal force as a driving force for moving liquid in the channels to separate or agitate the liquid.

As described above, with the disc drive apparatus according to the present invention, when printing visible information by ejecting ink droplets onto the label surface of a disc-shaped recording medium, the disc constant velocity rotating processing is carried out to continuously reproduce a constant velocity rotation address using the optical pickup. By doing so, it is possible to rotate the disc-shaped recording medium at a constant velocity while obtaining position information on the disc-shaped recording medium that is required when printing on the label surface. As a result, it is possible to carry out printing with constant timing for the ejection of ink droplets and therefore possible to carry out the ejecting of ink droplets with simple control.

Since the target rotational velocity of the disc-shaped recording medium is set during the disc constant velocity rotating processing and the constant velocity rotation address is set based on this target rotational velocity, it is possible to constantly rotate the disc-shaped recording medium at a predetermined rotational velocity, which makes it possible to simplify the control over the ejection timing of ink droplets.

Since the target rotational velocity and the constant velocity rotation address are set for each type of disc-shaped recording medium, it is possible to reliably rotate any type of disc-shaped recording medium at a constant rotational velocity without having to worry whether a constant velocity rotation address exists for a given type of disc-shaped recording medium. In addition, since the same target rotational velocity is set for disc-shaped recording media of the same disc standard, it is possible to emit ink droplets with the same timing on such disc-shaped recording media and thereby simplify the control over the ejection timing of the ink droplets.

Since the address reproduced when the rotational velocity of the disc-shaped recording medium matches the target rotational velocity is set as the constant velocity rotation address, it is possible to correctly control the rotational velocity of the disc-shaped recording medium. As a result, it is possible to print with high precision on the label surface of the disc-shaped recording medium.

The present invention is not limited to the embodiments described above and shown in the drawings and can be subjected to various modifications without departing from the scope of the invention. For example, although examples where optical discs such as a CD-R and DVD-RW are used as the disc-shaped recording medium have been described in the embodiments described above, it is also possible to apply the present invention to a disc drive apparatus that uses a disc-shaped recording medium such as a magneto-optical disc or a magnetic disc.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive apparatus comprising:
a rotational driving unit rotating a disc-shaped recording medium having a plurality of addresses recorded on an information recording surface of the disc-shaped recording medium;
an optical pickup recording and/or reproducing an information signal on the information recording surface of the disc-shaped recording medium rotated by the rotational driving unit; and
a control unit controlling rotation of the disc-shaped recording medium via the rotational driving unit, wherein
the control unit carries out a disc constant velocity rotating processing that sets a predetermined address out of the plurality of addresses as a constant velocity rotation address and continuously reproduces the constant velocity rotation address using the optical pickup;
wherein the control unit determines a target rotational velocity of the disc-shaped recording medium, and determines the constant velocity rotation address based on the target rotational velocity in the disc constant velocity rotating processing.

2. A disc drive apparatus according to claim 1, further comprising:
a print head printing visible information by ejecting ink droplets onto a label surface of the disc-shaped recording medium rotated by the rotational driving unit, wherein
the control unit carries out the disc constant velocity rotating processing when printing on the label surface of the disc-shaped recording medium.

3. A disc drive apparatus according to claim 1, wherein
the control unit determines the target rotational velocity and the constant velocity rotation address for each type of the disc-shaped recording medium.

4. A disc drive apparatus according to claim 3, further comprising:
a memory storing a plurality of constant velocity rotation addresses set for different types of the disc-shaped recording medium, wherein
the control unit reads the constant velocity rotation address corresponding to the disc-shaped recording medium being rotated from the memory.

5. A disc drive apparatus according to claim 3, further comprising:
a memory storing a plurality of provisional addresses and a plurality of target rotational velocities set for different types of the disc-shaped recording medium by the control unit, wherein
the control unit reads a target rotational velocity and a provisional address corresponding to the rotating disc-shaped recording medium from the memory and causes the optical pickup to continuously reproduce the provisional address,
the control unit sets, when a rotational velocity of the disc-shaped recording medium matches the target rotational velocity, the provisional address as the constant velocity rotation address, and the control unit changes, when the rotational velocity of the disc-shaped recording medium does not match the target rotational velocity, the reproduced address and sets the address reproduced when the rotational velocity of the disc-shaped recording medium matches the target rotational velocity as the constant velocity rotation address.

6. A disc drive apparatus according to claim 5, wherein the control unit stores the constant velocity rotation address and a type of the disc-shaped recording medium corresponding to the constant velocity rotation address in the memory.

* * * * *